(12) United States Patent
Wilbanks, Jr. et al.

(10) Patent No.: US 7,478,501 B2
(45) Date of Patent: Jan. 20, 2009

(54) MODULAR INTERLOCKING PLANT SUPPORT SYSTEM

(76) Inventors: Robert Wilbanks, Jr., 841 Rosedale, Corpus Christi, TX (US) 78411; Helen C. Wilbanks, 841 Rosedale, Corpus Christi, TX (US) 78411

( * ) Notice: Subject to any disclaimer, the term of this patent is extended or adjusted under 35 U.S.C. 154(b) by 314 days.

(21) Appl. No.: 11/512,867

(22) Filed: Aug. 29, 2006

(65) Prior Publication Data
US 2007/0062108 A1   Mar. 22, 2007

Related U.S. Application Data

(60) Provisional application No. 60/713,773, filed on Sep. 2, 2005.

(51) Int. Cl.
*A01G 1/08*   (2006.01)
*A01G 9/12*   (2006.01)

(52) U.S. Cl. .............................. 47/45; 47/33
(58) Field of Classification Search .......... 47/32.7, 47/33, 45
See application file for complete search history.

(56) References Cited

U.S. PATENT DOCUMENTS

| | | | | |
|---|---|---|---|---|
| 1,560,404 A * | 11/1925 | Brown | | 47/47 |
| 2,763,096 A * | 9/1956 | Roger | | 47/45 |
| 4,040,630 A * | 8/1977 | Brattain | | 273/157 R |
| 4,561,208 A * | 12/1985 | Schultz | | 47/83 |
| 4,962,614 A * | 10/1990 | Koerper | | 47/66.1 |
| 5,092,076 A * | 3/1992 | Terreta | | 47/33 |
| 5,168,678 A * | 12/1992 | Scott et al. | | 52/102 |
| 5,345,711 A * | 9/1994 | Friesner | | 47/32.4 |
| 5,577,343 A * | 11/1996 | Flasch, Jr. | | 47/33 |
| 5,640,802 A * | 6/1997 | Elliott | | 47/45 |
| 5,809,689 A * | 9/1998 | Mathur | | 47/32.4 |
| 5,862,629 A * | 1/1999 | Sulyman | | 47/66.1 |
| 6,336,290 B1 * | 1/2002 | Callan | | 47/33 |
| 6,389,742 B1 * | 5/2002 | Wuster | | 47/33 |
| 6,418,675 B1 * | 7/2002 | Peggs et al. | | 52/102 |
| 6,854,221 B1 * | 2/2005 | Michaels | | 52/102 |
| 2005/0155284 A1 * | 7/2005 | Kulas | | 47/31 |

FOREIGN PATENT DOCUMENTS

| GB | 2273117 A | * | 6/1994 |
|---|---|---|---|
| GB | 2376261 A | * | 12/2002 |

* cited by examiner

*Primary Examiner*—Son T. Nguyen
(74) *Attorney, Agent, or Firm*—Raymond M. Galasso; Galasso & Associates, LP

(57) ABSTRACT

A modular plant support system for supporting growing plants made up of a stacked interlocking layers of cylindrical split rings. The split rings are flexible and modular and configured to interconnect end to end so as to form a plant support layer of any reasonable diameter by coupling multiple sections. The layers of the plant support stand may be stacked and interconnected to form a plant support system of a height suited to support requirements of the plant.

4 Claims, 7 Drawing Sheets

MODULAR INTERLOCKING PLANT SUPPORT SYSTEM

CROSS REFERENCE TO RELATED APPLICATIONS

This application claims priority to co-pending U.S. Provisional Patent Application having Ser. No. 60/713,773 filed Sep. 2, 2005 entitled "Gardener's friend plant support system", having a common applicant herewith.

FIELD OF THE DISCLOSURE

The disclosures made herein relate generally to devices for aiding the support of growing plants and, more particularly, to system of stackable interlocking layers of flexible tubular split rings wherein the diameter of each layer may be extended by coupling additional tubular split rings in between the split of the first ring.

BACKGROUND

It is known to gardeners and nursery practitioners that young and growing plants often require support during growth. Many examples of such cases are well known. For example, vegetable producing plants such as tomato plants and varieties of pepper plants require support while the fruit, for example tomatoes, are growing. The mass of the growth can often exceed the support which the plant stalk is able to provide, and if left unsupported, the plant will fall to one side or collapse upon itself. Traditionally gardeners utilize one or more stakes or rods driven into the soil near the plant and a series of flexible support bands such as cloth strips wrapped about the growing plant and secured to the stakes.

A limitation of this stake plant support technique is the time it takes to wrap bands securing the plant to the stake. Additionally, many times the wrapping material will rub against and damage the plant as the plant moves in the wind as well.

Another limitation of supporting plants from vertical stakes is that the support provided by the stakes is less than optimum as the wrapped support material can slide down the stake, allowing the plant to collapse upon itself.

Another variety of known plant support devices are generally of a fixed size and shape, for example common wire tomato plant cages. Such cages generally consist of a plurality of wire rings, the rings axially aligned and held in a spaced apart relationship from one another by a plurality of wire rods secured to similar portions of each ring, the rods having one end extending outwards from the bottom ring and configured to be pressed into the soil.

A limitation of other wire tomato cage type plant supports is that the cages have a fixed height and diameter and is therefore not adaptable to plants requiring other plant support diameters and heights.

Therefore, a plant support system which may be configured to adjust to the diameter of the plant, a plant support system which has layers that may be supportively stacked upon a base layer to provide a plant support structure having a height to suit the height of the plant, a support which has windows to permit plant growth such as shoots and stems to extend outwards from the support seeking light as well as to permit sunlight into the interior of the plant support system to encourage plant growth, a plant support system which is made of pieces which are flexible and modular and configured to interlock so as to form a plant support of any reasonable diameter and any reasonable height, such a plant support system would be useful and novel.

SUMMARY OF THE DISCLOSURE

Accordingly, embodiments of the inventive disclosures made herein comprise a system for supporting growing plants comprising stacked layers of split rings, the rings flexible and modular and configured to joinably connect so as to form a plant support stand of any reasonable diameter, the layers stackably interconnectable to form a plant support system of a height suited to support requirements of the plant.

In a first embodiment, the modular interlocking plant support system includes a plant support base. The plant support base has at least one flexible tubular base section forming a split ring. The tubular base section has a substantially cylindrical wall. A plurality of ground spikes extend outwards from the bottom edge of the tubular base section. The ground spikes are elongated and are of sufficient length to be pressably embeddable into the soil about the perimeter of the plant so as to engage the tubular base section into the soil. A door hinge style coupler is provided on the base section on facing side of the split. The door hinge style coupler comprises two mating halves with each hinge style coupler half having a bore for receiving a pin therethough. The coupler has a first half secured to a first side of the split and a second half secured to the opposing side of the split. The first and second halves are configured and adapted to mate and engage such that the bores in the first and second halves align when engaged thereby permitting a pin to be inserted through the bores to retentively couple the first and second halves together. The door hinge style coupler is separable to permit the tubular base section to be spread to allow the door style hinge coupling of one or more additional tubular base sections to be added to the first base section so as to increase the diameter of the base for supporting larger diameter plants. The tubular base sections have a plurality of cylindrical bores spaced about the top edge of the cylindrical wall for engaging with pins of the next support layer such that the layers are stackable.

Subsequent layers of the plant support system is made up of one or more stackable plant support extension layers. Each plant support extension layer comprises at least one flexible tubular extension section forming a ring. The tubular extension section has a substantially cylindrical wall with a plurality of window openings therethrough. The window openings permit plant growth through the cylindrical wall of the tubular extension section. The wall of the tubular extension section has a plurality of cylindrical bores through the top edge of the cylindrical wall. The cylindrical wall of each extension section has a split so as to form a split ring. The ring is spreadable at the split to permit one or more additional tubular extension sections to be inserted into the layer so as to increase the diameter of the plant support extension layer to match the diameter of the plant support base layer for supporting larger diameter plants. A plurality of pins extends downward from the bottom edge of the tubular extension section. The pins are sized and adapted to be received into the cylindrical bores of the layer directly below, the layer either a plant support base layer or another plant support extension layer, such that the plant support extension is stackably secured via the pins to the base layer directly below. Then the height of the system is extended by the use of additional plant support extensions stackably secured and interlocked via the pins into the bores of the plant support extension layer located immediately below.

In another embodiment of the modular interlocking plant support system, the plant support base and plant support section are made of molded plastic material and the pins and spikes are molded into the cylindrical side walls of the plant support base and plant support extension.

In another embodiment of the modular interlocking plant support system, the bores of the plant support extension layer are aligned with the pins of the plant support base layer. The bores of the plant support base layer are aligned with the ground spikes of the plant support base layer and the plant support base and plant support extension have an equal number of bores.

It is an objective of the inventive disclosures made herein to provide a plant support system which may be configured to adjust to the diameter of the plant.

It is another objective of the inventive disclosures made herein to provide a plant support system which has layers that may be supportively stacked upon a base layer to provide a support having a height to suit the height of the plant.

It is another objective of the inventive disclosures made herein to provide a plant support system which has windows to permit plant growth such as shoots and stems to extend outwards from the support as well as permit sunlight into the interior of the plant support system to encourage plant growth.

It is another objective of the inventive disclosures made herein to provide a plant support system which is made of pieces which are flexible and modular and configured to join so as to form a plant support of any reasonable diameter and any reasonable height.

These and other objects of the invention made herein will become readily apparent upon further review of the following specification and associated drawings.

BRIEF DESCRIPTION OF THE DRAWINGS

The drawings show a form of the invention that is presently preferred; however, the invention is not limited to the precise arrangement shown in the drawings.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Figure 1:
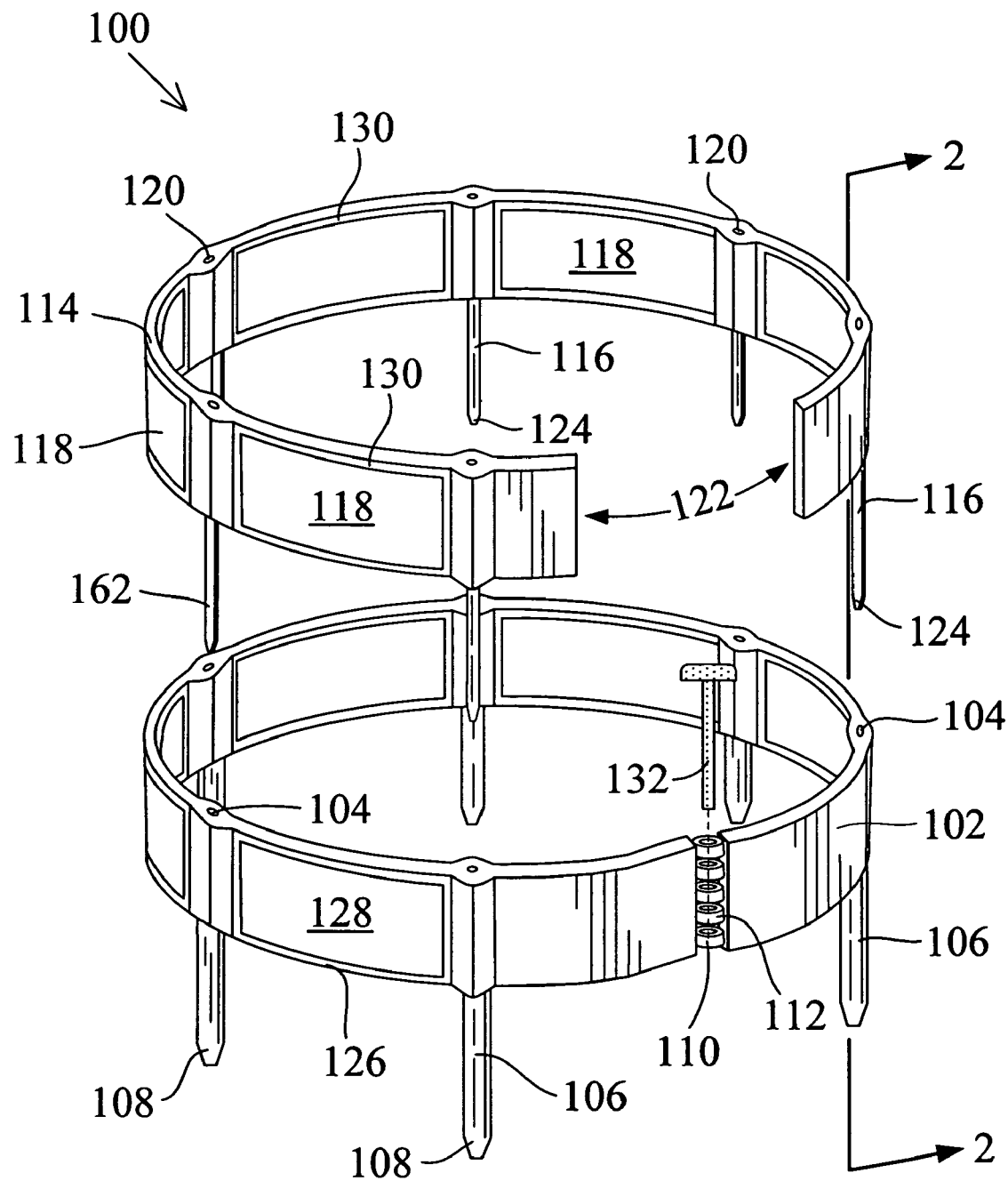
FIG. 1 depicts a perspective view of one embodiment, a modular interlocking plant support system in accordance with the inventive disclosures herein.
Figure 2:
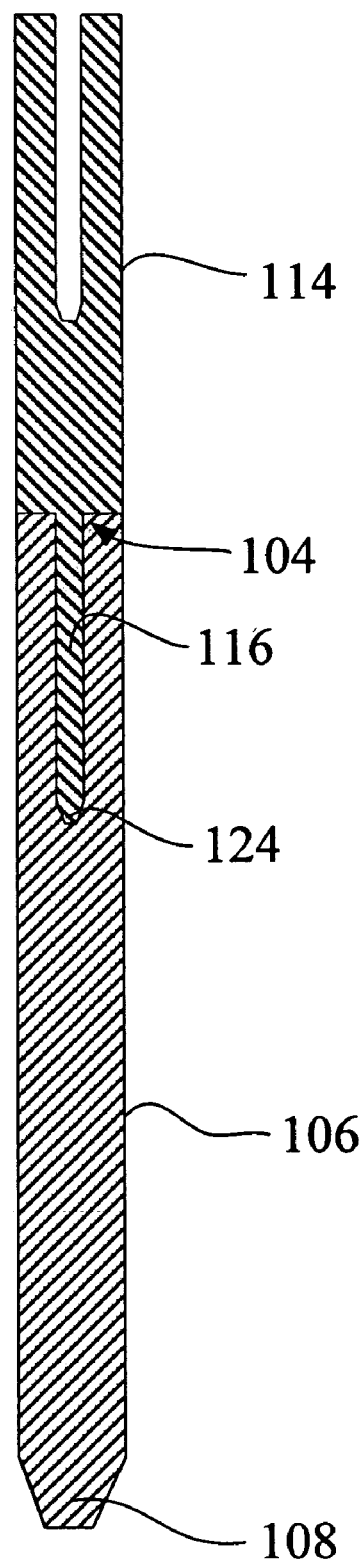
FIG. 2 depicts a cross sectional view (section 2-2 of FIG. 1) of a pin of the extension layer engaged into the bore of the plant support base layer so as to stackably engage the layers in accordance with the inventive disclosures herein.
Figure 3:
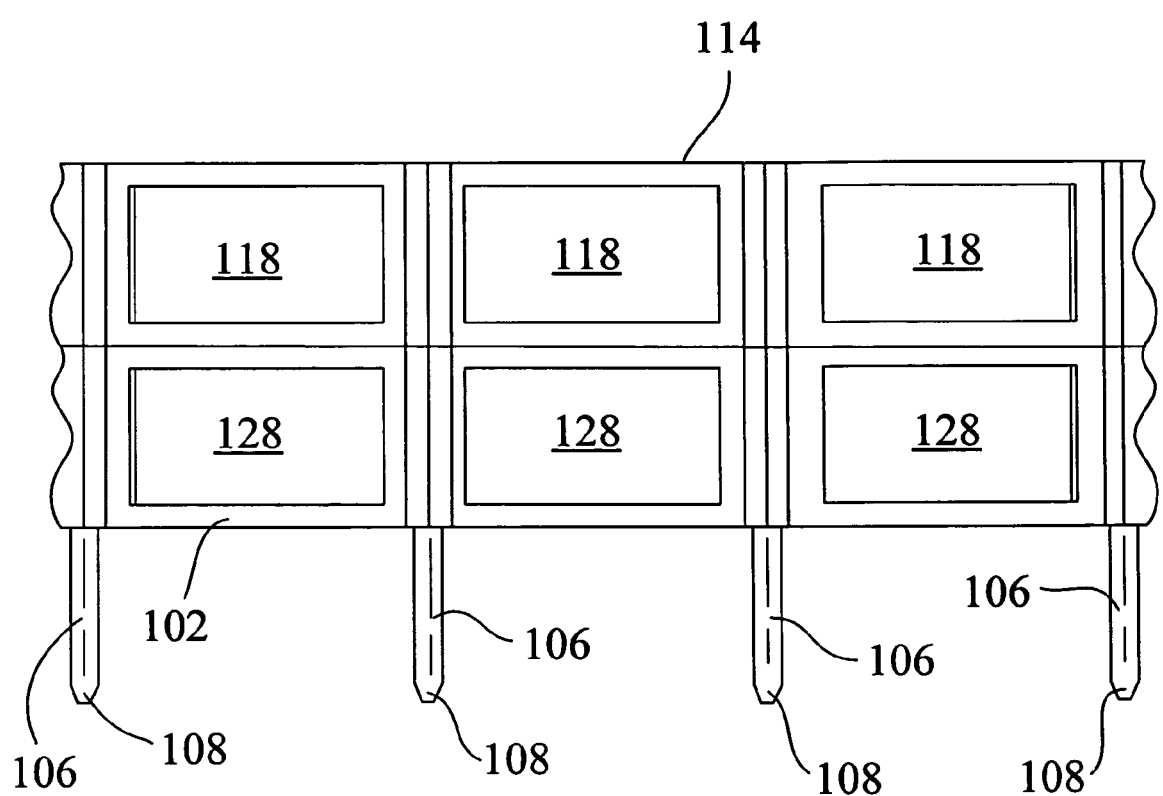
FIG. 3 depicts a side view of one extension layer stackably engaged into the plant support layer to form a two layer plant support, in accordance with the inventive disclosures herein.

Turning now to FIG. 1, FIG. 2 and FIG. 3:

FIG. 1 depicts a perspective view of one embodiment, a modular interlocking plant support system in accordance with the inventive disclosures herein. FIG. 2 depicts a cross sectional view (section 2-2 of FIG. 1) of a pin of the extension layer engaged into the bore of the plant support base layer so as to stackably engage the layers in accordance with the inventive disclosures herein. FIG. 3 depicts a side view of one extension layer stackably engaged into the plant support layer to form a two layer plant support, in accordance with the inventive disclosures herein.

The plant support stand 100 is depicted with plant support layer having a single flexible split ring tubular base section 102, the tubular base having a substantially cylindrical wall. The tubular base section 102 has a plurality of bores 104 in a top edge of the cylindrical wall of the tubular base section 102. A plurality of ground spikes 106 extend downwards from the bottom edge of the tubular base section 102, the ground spikes 106 having a tapered point for pressably embedding into and supporting the plant support stand upon the soil around the plant. A door hinge style coupler consists of two mating halves 110 and 112. Each hinge style coupler half has a bore for receiving a pin therethough. The first 110 and second 112 halves configured and adapted to mate such that the bores in the first and second halves align thereby permitting a pin 132 to be inserted therethrough to retentively couple the first and second halves together.

The depicted exemplary plant support system has a single plant support extension layer consisting of a single flexible tubular extension section 114 which is stackably engaged and interlocked into the split ring tubular base section 102. The flexible tubular extension section 114 forms a split ring with the tubular extension section having a substantially cylindrical wall having a plurality of window openings 118 through the wall. The window openings permit plant growth through the cylindrical wall of the tubular extension section 114. The wall of the tubular extension section includes a top edge having a plurality of cylindrical bores 120. The cylindrical wall of each extension section has a split 122. The split in the tubular extension section permits one or more additional tubular extension sections to be inserted so as to increase the diameter of the plant support extension layer to match the diameter of the plant support base layer for supporting larger diameter plants. The flexible tubular extension section 114 has a plurality of pins 116 extending outwards from the bottom edge of the tubular extension section 114. The pins having first end secured to the tubular extension section and an opposing second end 124 adapted to be received into the cylindrical bores 102 of one of the plant support base or another plant support extension (not depicted).

Figure 4A:
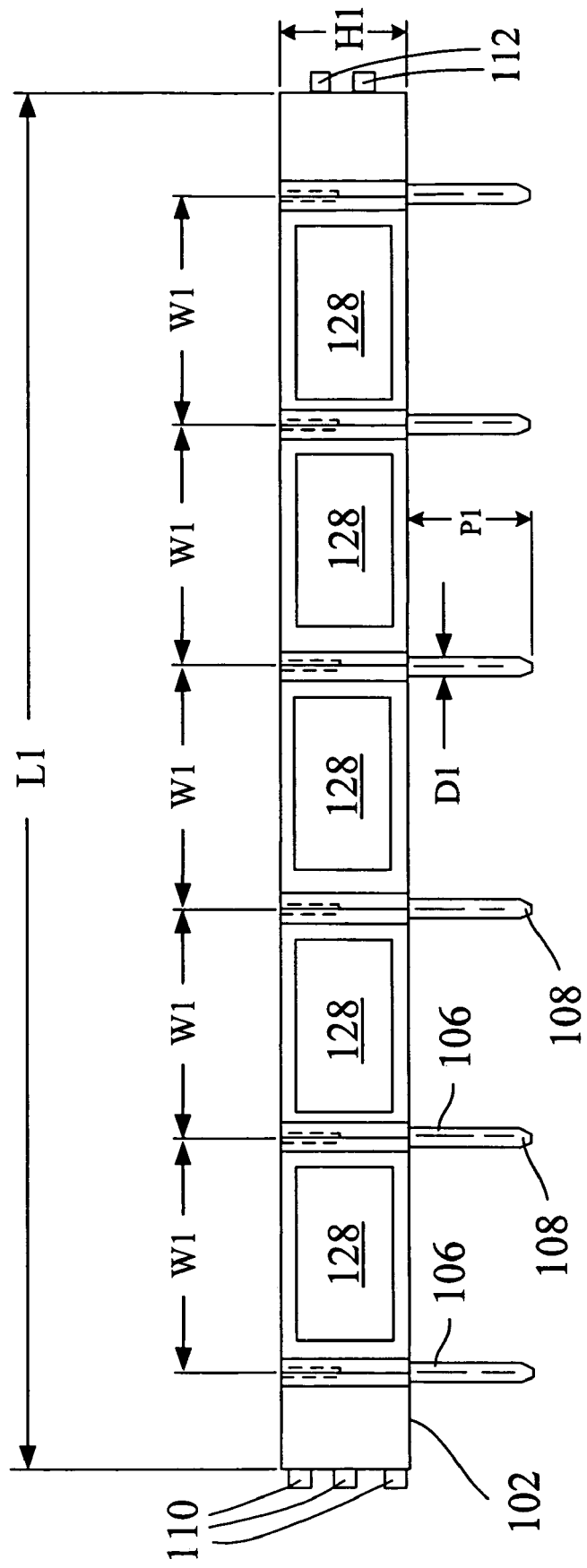
FIG. 4A depicts a plan view of one section of the base layer of the modular interlocking plant support system in accordance with the inventive disclosures herein. The base layer is depicted as laying flat, perhaps as packaged for retail sale, rather than the curved form of FIG. 1.
Figure 4B:
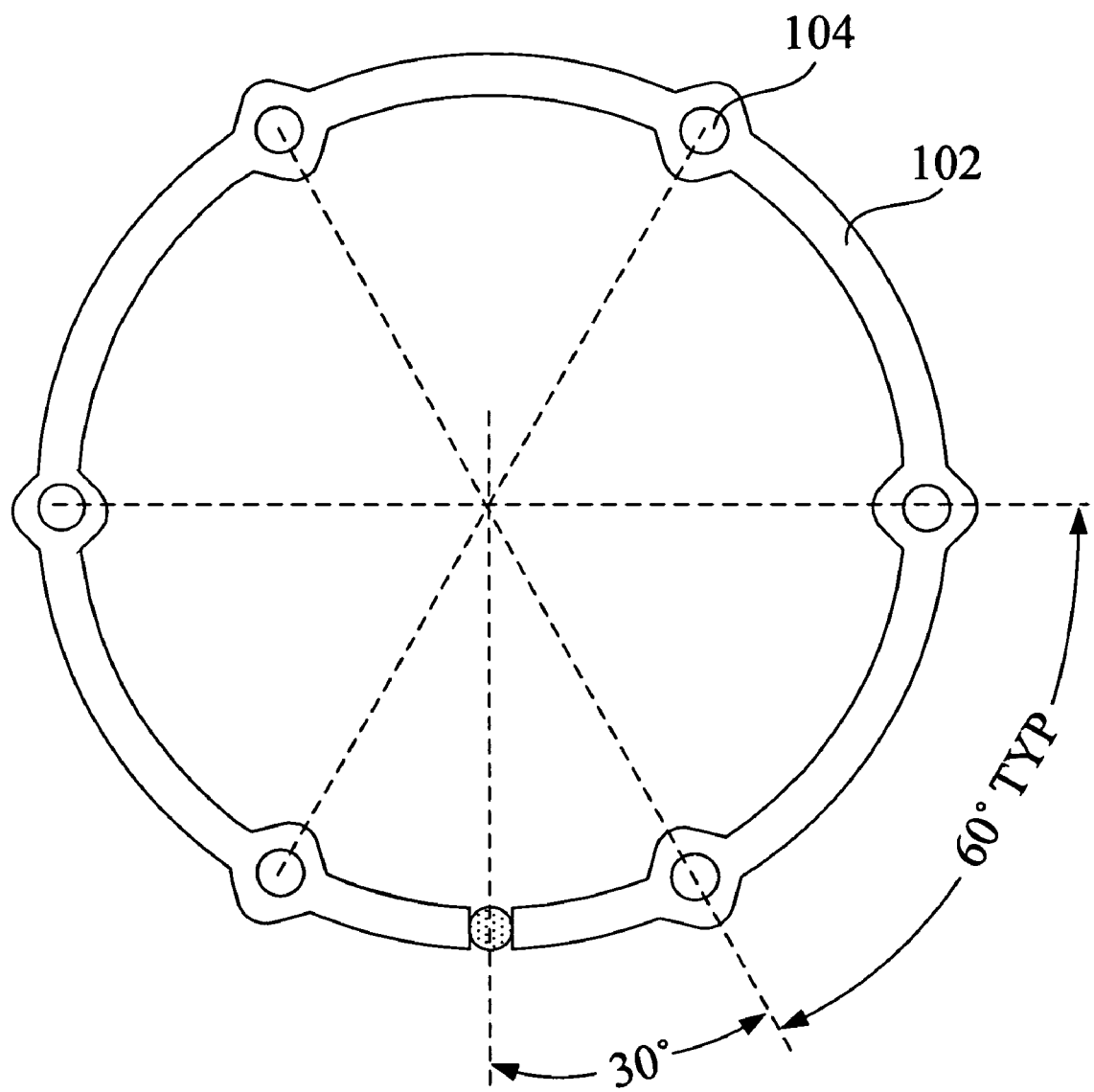
FIG. 4B depicts a top view of one section of the base layer of the modular interlocking plant support system in accordance with the inventive disclosures herein. The base layer is closed upon itself in a circular form as depicted FIG. 1.

Turning now to FIG. 4A and FIG. 4B:

FIG. 4A depicts a plan view of one section of the base layer of the modular interlocking plant support system in accordance with the inventive disclosures herein. The base layer is depicted as laying flat, perhaps as packaged for retail sale, rather than the curved form of FIG. 1. FIG. 4B depicts a top view of one section of the base layer of the modular interlocking plant support system in accordance with the inventive disclosures herein. The base layer is closed upon itself in a circular form as depicted FIG. 1. One section of the base layer 102 of the plant support stand 100 is depicted. The depicted base section consists of multiple flexible panels 126, each panel having a window 128 or opening through the panel to permit sunlight to enter, as well as to provide an opening through which fruit may be harvested from the plant. Opposing ends of the base layer section 102 are provided with half portions of a hinge style coupler 110 and 112 which are configured for mating and engaging by placing a pin through the loops of the hinge members 110 and 112.

Dimension labels are shown to reference typical dimension for one particular embodiment of the disclosed plant support stand. These dimensions are provided for enablement and are not to be taken as limiting in any way and are for only one particular embodiment. In one particular embodiment the distance between the bores 104 in FIG. 4A (label W1) is 7 5/16 inches. The height of the base layer (label H1) is 8 inches. The overall length of the ground spike 108 (label P1) is 8 inches, and the diameter of the ground spikes (label D1) is 1 13/32 inches. In this particular embodiment the base section has an overall length (label L1) of 3 foot 8 inches. When the base section is closed upon itself by engaging the hinge coupler, the bores 104 are separated by an angle of 60 degrees.

Figure 5A:
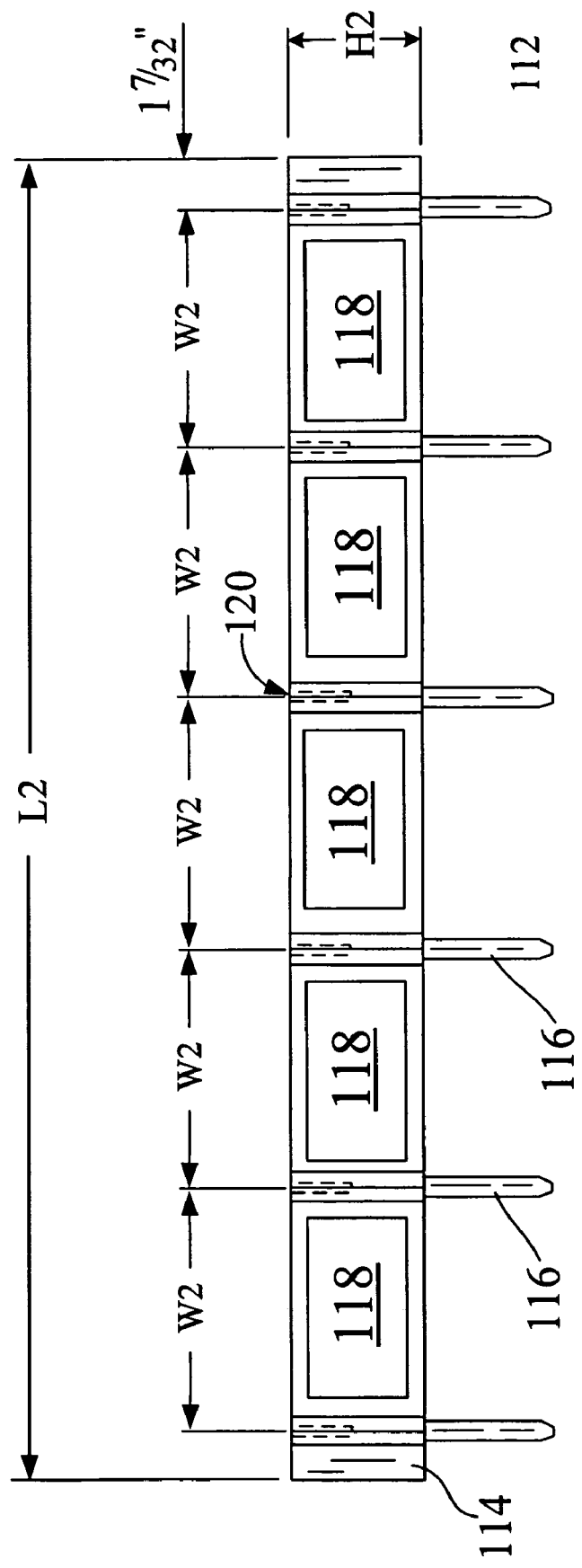
FIG. 5A depicts a plan view of one section of the extension layer of the modular interlocking plant support system in accordance with the inventive disclosures herein. The extension layer is depicted as laying flat, perhaps as packaged for retail sale, rather than the curved form of FIG. 1.
Figure 5B:
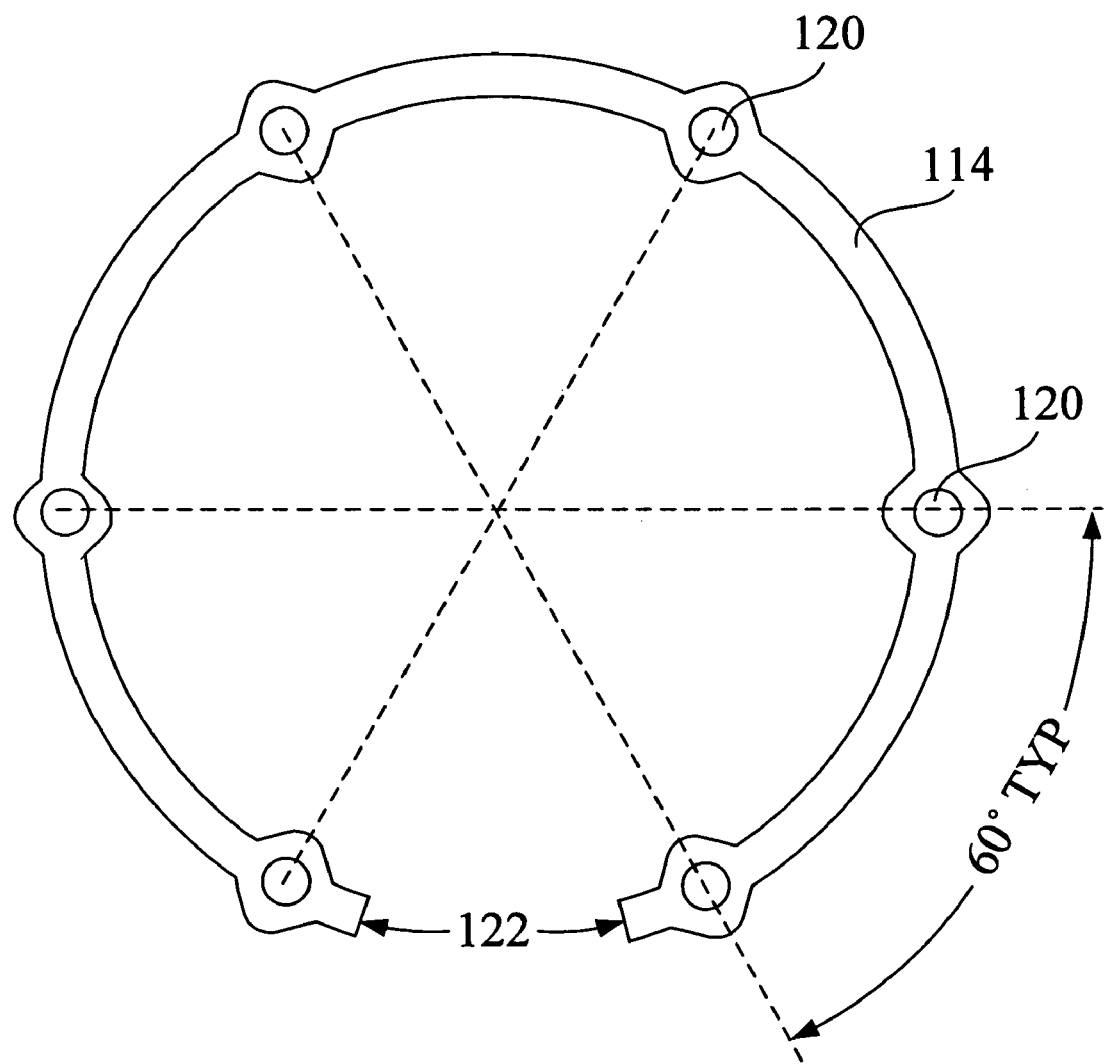
FIG. 5B depicts a top view of one section of the extension layer of the modular interlocking plant support system in accordance with the inventive disclosures herein. The extension layer is closed upon itself in a circular form as depicted FIG. 1.

Turning now to FIG. 5A and FIG. 5B:

FIG. 5A depicts a plan view of one section of the extension layer of the modular interlocking plant support system in accordance with the inventive disclosures herein. The extension layer is depicted as laying flat, perhaps as packaged for retail sale, rather than the curved form of FIG. 1. FIG. 5B depicts a top view of one section of the extension layer of the modular interlocking plant support system in accordance with the inventive disclosures herein. The extension layer is closed upon itself in a circular form as depicted FIG. 1 The extension section has a plurality of flexible panels 130, each panel having a window 118 to permit sunlight to enter through the plant support system and to provide access to fruit on the plant. The lower portion of the extension section is equipped with plurality of pins 116 that are sized to into the bores 104 of the either the base section 102 or into the bores 120 an another extension section, the pin and bore arrangement allowing the sections to be layered one upon the other to provide a plant support of the desired height.

Dimension labels are shown to reference typical dimension for one particular embodiment of an extension section for the disclosed plant support stand. These dimensions are provided for enablement and are not to be taken as limiting in any way and are for only one particular embodiment. In one particular embodiment the distance between the bores 104 in FIG. 4A (label W2) is 7 5/16 inches. The height of the extension layer (label H2) is 8 inches. The diameter of the pins 116 is 5/16 inch. In this particular embodiment the extension section has an overall length (label L2) of 3 foot 3 inches. When the base section is closed upon itself by engaging the hinge coupler, the bores 120 in the mated extension section 114 are separated by an angle of 60 degrees.

The discussed construction, illustrations and sequence of operation is for one embodiment of the invention, but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, and mechanical changes may be made without departing from the spirit or scope of the invention. To avoid unnecessary detail, the description omits certain information known to those skilled in the art. The preceding detailed description is; therefore, not intended to be limited to the specific forms set forth herein, but on the contrary, it is intended to cover such alternatives, modifications, and equivalents, as can be reasonably included within the spirit and scope of the appended claims.

What is claimed is:

1. A modular interlocking plant support system providing a stand having variable height and diameter for supporting growing plants in soil, comprising:

a plant cylindrical support base layer comprising:
at least one flexible tubular base section, each flexible base section comprising:
a plurality of flexible panels, the panels having a window therethrough to permit sunlight to reach the plant and to permit harvesting of fruit, the panels forming a wall, the wall having an inside surface, an outside surface, a top edge having a plurality of bores and a bottom edge;
a plurality of ground spikes extending outwards from the bottom edge of the base section, the ground spikes having first end secured to the base section and an opposing second end having a tapered point adapted for pressably embedding into and supporting upon the soil;
a coupler means comprising two mating halves, the coupler means having a first half secured to a first end of the base section and a second half secured to an opposing end of the base section, the first and second halves configured and adapted to mate and couple together, the coupling means halves separable to permit the base section to be spread to allow the coupling of one or more additional base sections so as to increase the diameter of the plant support base for supporting larger diameter plants; and at least one plant support extension layer comprising:
at least one flexible tubular extension section, the tubular extension section having a wall, the wall having a plurality of window openings therethrough, the window openings permitting sunlight to reach the plant and permitting the harvesting of fruit, the wall of the extension section including a top edge having a plurality of cylindrical bores and a bottom edge, the wall of each extension section having a split, the split in the extension section permitting one or more additional extension sections to be inserted so as to increase the diameter of the plant support extension layer to match the diameter of the plant support base layer for supporting larger diameter plants; and
a plurality of pins extending outwards from the bottom edge of the extension section, the pins having first end secured to the extension section and an opposing second end adapted to be received into the cylindrical bores of one of the plant support base or another plant support extension, wherein a first plant support extension layer is stackably secured via the pins to the plant support base layer, wherein the height of the system is extendable by the use of additional plant support extension layers stackably secured via their pins into the bores of the plant support extension layer located immediately below.

2. The system of claim 1 wherein the coupler means comprises a door hinge style coupler having two mating halves, each hinge style coupler half having a bore for receiving a pin therethough for coupling the two halves.

3. The system of claim 1 wherein:
the plant support base layer and plant support section layer comprise plastic; and
wherein the spikes are molded into the walls of the plant support base layer and the pins are molded into the walls of the plant support extension layers.

4. The system of claim 1 wherein
the bores of the plant support extension layer are aligned with the pins of the plant support section layer,
wherein the bores of the plant support base layer are aligned with the ground spikes of the plant support base layer and
wherein the plant support base layer and plant support extension layer have an equal number of bores.

* * * * *